United States Patent
Marumo

(10) Patent No.: US 7,661,188 B2
(45) Date of Patent: Feb. 16, 2010

(54) METHOD OF MANUFACTURING GLASS SUBSTRATE FOR MAGNETIC DISK

(75) Inventor: Yoshinori Marumo, Tokyo (JP)

(73) Assignee: Hoya Corporation, Tokyo (JP)

( * ) Notice: Subject to any disclaimer, the term of this patent is extended or adjusted under 35 U.S.C. 154(b) by 156 days.

(21) Appl. No.: 11/387,929

(22) Filed: Mar. 24, 2006

(65) Prior Publication Data

US 2006/0266732 A1 Nov. 30, 2006

(30) Foreign Application Priority Data

Mar. 24, 2005 (JP) .............................. 2005-086024

(51) Int. Cl.
  *G11B 5/127* (2006.01)
  *B44C 1/22* (2006.01)
(52) U.S. Cl. ................ 29/603.1; 29/603.13; 29/603.16; 29/830; 29/831; 29/832; 216/31
(58) Field of Classification Search ................ 29/603.1, 29/603.13, 603.16, 830, 831, 832; 216/22, 216/31, 97; 134/1.2; 427/487; 438/693, 438/692; 536/25.3; 428/209; 365/94
  See application file for complete search history.

(56) References Cited

U.S. PATENT DOCUMENTS

| 3,453,652 | A | * | 7/1969 | Marzocchi ................... 57/249 |
| 3,585,072 | A | * | 6/1971 | Templeton .................. 427/601 |
| 4,724,188 | A | * | 2/1988 | Saito et al. .................. 428/457 |
| 4,808,638 | A | * | 2/1989 | Steinkraus et al. ............ 522/24 |
| 5,695,386 | A | * | 12/1997 | Ryoke et al. .................. 451/41 |
| 6,326,326 | B1 | * | 12/2001 | Feng et al. .................... 502/62 |
| 6,544,893 | B2 | * | 4/2003 | Eto ............................ 438/693 |
| 6,568,995 | B1 | * | 5/2003 | Mitani et al. .................. 451/36 |

FOREIGN PATENT DOCUMENTS

JP 2001-206737 A 7/2001

* cited by examiner

*Primary Examiner*—Derris H Banks
*Assistant Examiner*—Tai Nguyen
(74) *Attorney, Agent, or Firm*—Sughrue Mion, PLLC

(57) ABSTRACT

In a manufacturing method of a glass substrate for a magnetic disk including a cleaning process of the glass substrate, the cleaning process includes a process of contacting the glass substrate with a cleaning solution containing a compound, such as thioglycolic acid or a thioglycolic acid derivative, having a thiol group as a functional group.

15 Claims, No Drawings

METHOD OF MANUFACTURING GLASS SUBSTRATE FOR MAGNETIC DISK

This application claims priority to Japanese Patent Application No. 2005-86024, the disclosure of which is incorporated herein by reference.

BACKGROUND OF THE INVENTION

This invention relates to a method of manufacturing a glass substrate for a magnetic disk adapted to be mounted in a magnetic disk device such as a HDD (hard disk drive), and so on, and in particular, relates to a cleaning solution and a cleaning method for use in cleaning the surface of a magnetic recording disk glass substrate that is subjected to a problem of particle contamination firmly adhering to the substrate surface, and so on.

The manufacturing process of a magnetic recording disk glass substrate and a magnetic recording disk carries out thin film formation on the glass substrate surface in the order of several nm, formation of recording/reproducing tracks, and so on. Therefore, in the manufacturing process of them, it is an important subject to remove even slight contamination on the glass substrate surface to thereby keep the substrate surface clean. Among the contamination, particularly the particle contamination is required to be removed in the manufacturing process of the magnetic recording disk glass substrate because it causes roughness (irregularities) on the surface after the film formation and lowers electrical properties such as recording/reproduction and yield of products. Since the particle contamination due to abrasive residue and metal particles is produced in the manufacturing process of the magnetic recording disk glass substrate, the surface cleaning with a cleaning solution is used in order to remove such particle contamination.

Generally, it is known that an alkaline aqueous solution is effective for removing particle contamination such as particles adhering or adsorbing to the substrate surface with a relatively weak force. Specifically, use is made of an alkaline aqueous solution such as sodium hydroxide or potassium hydroxide, or a cleaning solution added with a surfactant.

Use is also made of an acidic cleaning solution that lifts off the foreign matter adhering to the substrate surface with a relatively strong force or biting into the substrate surface (thoroughly eliminates particles along with the substrate surface) by mainly etching the substrate. As the cleaning solution for the liftoff, use is made of a fluorine-based chemical solution, for example, a dilute solution of hydrofluoric acid, hydrosilicofluoric acid, ammonium fluoride, buffered hydrofluoric acid, or the like.

Further, as a cleaning solution for dissolving and removing the foreign matter itself adhering to the substrate surface with a relatively strong force or biting into the substrate surface, use is made of a cleaning solution using an inorganic acid such as sulfuric acid or nitric acid, an organic acid such as oxalic acid or ascorbic acid, or a chelating agent such as EDTA (ethylenediaminetetraacetate) or citric acid.

Among the adhering particles, particularly the particle contamination adhering to the surface is firmly adhering or fusion-bonded to the glass surface before and after a glass strengthening process and, therefore, cannot be removed by alkaline cleaning or acid cleaning generally used for cleaning the particle contamination. As a method of cleaning the particle contamination that is firmly adhering or fusion-bonded to the glass surface before and after such a glass strengthening process and cannot be removed by the alkaline cleaning or the acid cleaning, use is made of a method (liftoff method) that entirely strips the adhering particles by thinly etching the glass substrate surface by the use of a solution containing a fluoride, for example, hydrofluoric acid, ammonium fluoride, silicofluoric acid, or the like.

When the liftoff method is used, since the substrate itself is etched, the surface roughness of the substrate itself problematically increases if the etching amount is increased. Conversely, if the etching amount is reduced so as not to increase the surface roughness, objects cannot be lifted off and problematically remain as minute projections.

The particle contamination firmly adhering or fusion-bonded to the substrate surface is often an abrasive component such as cerium oxide or foreign matter (iron-based contamination) such as iron oxide that is in a thermodynamically very stable state. It is known that cerium oxide-based particles can be dissolved and removed by a mixed solution of sulfuric acid and aqueous hydrogen peroxide, or a solution in a combination of an acid and a reducing agent such as ascorbic acid, which is described in Japanese Unexamined Patent Publication No. 2001-206737 (Patent Document 1). However, a chemical solution effective for rapidly dissolving transition metal oxide-based, particularly iron oxide-based particles themselves has not been found except very reactive heated concentrated sulfuric acid-aqueous hydrogen peroxide.

SUMMARY OF THE INVENTION

This invention has been made under the foregoing circumstances and has an object to provide a substrate surface cleaning solution and cleaning method that can rapidly dissolve and remove iron oxide-based foreign matter (metal oxide/transition metal oxide-based contamination) adhering to the surface of a magnetic disk glass substrate and, further, metal oxide-based foreign matter itself firmly adhering or fusion-bonded to the substrate surface, such as abrasive residue (metal oxide/rare earth oxide-based contamination) itself, without corroding the substrate surface, thereby cleaning the substrate surface to a high degree.

In view of the foregoing problem and object, studies have been made on magnetic disk glass substrate cleaning solutions using many kinds of inorganic acids, organic acids, reducing agents, chelating agents, and their combinations as will be described later.

As a result, it has been found that each of cleaning solutions (aqueous solutions), each containing a compound such as thioglycolic acid or its derivative, exhibits dissolvability to iron oxide particles and a metal oxide such as lanthanoid oxide such as lanthanum oxide or neodymium oxide being a component of a cerium abrasive when the pH of each solution is set to 5 or more.

Although all about the mechanism of dissolution of iron oxides and so on is not clear, metal oxides such as transition metal oxides normally form a stable state of $M_xO_y$ (M: metal). Upon dissolving an oxide, it is necessary to take the form of an ion and, therefore, use is made of a complexing reaction or an ionization reaction by a reduction reaction. The compound such as thioglycolic acid or its derivative contains a thiol group (SH group) having reducing properties. Since the SH group has a higher affinity to a metal than to a M—O band of a metal oxide, it is considered that a complex ion is formed. An iron ion aqueous solution is mostly divalent ions when it is neutral at pH 7, and shows pale yellow. However, since the color in a neutral region of a dissolved solution actually obtained by complete dissolution of iron oxide powder itself according to this invention is purplish red, it is considered that trivalent iron oxide is reduced to form thioglycolic acid and a complex as divalent complex ions. That is, it is considered that what is important as a basic structure is thioglycolic acid (a thiol group (—SH) and a carboxyl group (COOH or COO—) in a molecular structure).

As described above, it has been made clear that the pH of the solution containing the compound such as thioglycolic acid or its derivative is largely concerned in the dissolvability to the foregoing metal oxide and the dissolvability to the foregoing metal oxide largely depends on the pH.

When the pH of the solution containing the compound such as thioglycolic acid or its derivative is less than 5, the foregoing metal oxide cannot be dissolved.

When the pH of the solution containing the compound such as thioglycolic acid or its derivative is less than 5, the dissolvability to the foregoing metal oxide appears by adjusting the pH of the solution to 5 or more by the use of an alkali such as NaOH, KOH, or $NH_4OH$. There was observed no change in dissolvability at the same pH even by using any of the foregoing alkalis.

In terms of the function of rapidly dissolving and removing the foregoing metal oxide-based foreign matter itself, the pH of the solution containing the compound such as thioglycolic acid or its derivative is optimally 7 to 9. In the case of an ammonium thioglycolate solution or the like, the solution itself is at about pH 8 and thus falls within the optimal pH range. Therefore, the pH adjustment is not required, which is thus preferable.

The reducing power of a compound containing a thiol group as a functional group is affected by the other portion so that a large difference is caused. In consideration of the foregoing metal oxide dissolution mechanism, it is thought that a basic structure for the reduction is the thiol group (—SH) and the reducing action (electron giving action) following RS—SR oxidation of R—SH (disulfide formation) is exhibited. Particularly, it has been found that the solution containing the compound such as thioglycolic acid or its derivative exhibits particularly strong reducing action (electron giving action). Therefore, it is considered to largely contribute to the function of rapidly and completely dissolving the foregoing metal oxide itself.

It is considered that since the compound containing the thiol group as the functional group exhibits the reducing action (electron giving action), it can be used as a cleaning agent utilizing reducing action as generally known, or as an additive to a cleaning agent. The compound containing the thiol group as the functional group often exhibits strong reducing action (electron giving action) due to a molecular structure of a portion other than the thiol group, and it does not damage a glass substrate. Therefore, in the manufacturing process of a magnetic recording disk glass substrate, it can be effectively used as a cleaning agent or an additive to a cleaning agent for cleaning foreign matter firmly adhering to the surface (Structure 1).

Herein, judgment of usefulness, as the cleaning agent or the additive to the cleaning agent, of the compound containing the thiol group as the functional group can be considered by introducing a concept of hard acid/base and soft acid/base (Pearson theory). In a hard acid/base, valence electrons of the outer shell are firmly held and thus are not easily deformed or polarized. In a soft acid/base, valence electrons of the outer shell are easily polarized or separated. Further, a hard acid tends to bond to a hard base, while, a soft acid tends to bond to a soft base. This way of thinking is called a HSAB rule (Hard and Soft Acids and Bases rule). From this way of thinking, stability of complexes, reactivity of chemical reactions, and so on can be analogized to some degree. When the action on the iron oxide particles or the like is considered based on the Pearson theory, sulfur is softer than oxygen (oxygen is a strong base while sulfur is a soft base) and has a lower electronegativity. Therefore, sulfur has an affinity greater than oxygen for relatively soft metals (Fe, Co, and Ni) shown on the right side in the d-block of the periodic table and forms compounds in oxidation states of a wider range. A hard acid/base and a soft acid/base are experientially determined by tendencies observed in stability of complexes formed by them. The hard acid tends to bond to the hard base, while, the soft acid tends to bond to the soft base. Specifically, assuming that a soft base is present with respect to a bonded substance of a soft acid or a relatively soft acid and a hard base, the soft or relatively soft acid tends to bond to the soft base. It is considered that since oxygen is a strong base while sulfur is a soft base, the usefulness for the function of dissolving the iron oxide particles and as the cleaning agent or the additive to the cleaning agent as described above is exhibited. As soft bases (chemical substances each having a thiol group (—SH) in a molecular structure), use is made of, in addition to the foregoing thioglycolic acid and thioglycolic acid derivatives, mercaptosuccinic acid, mercaptopropionic acid, their derivatives, dodecanethiol, thioalcohols/thioethers, aminothiols such as aminoethanethiol, aminoethanethiol hydrochloride, 2-aminoethanethiol hydrochloride, and so on.

This invention has the following structures.

(Structure 1)

A method of manufacturing a glass substrate for a magnetic disk including a cleaning process of the glass substrate, wherein:

the cleaning process includes a process of contacting the glass substrate with a cleaning solution containing a compound having a thiol group as a functional group.

(Structure 2)

The method according to Structure 1, wherein:

the compound is thioglycolic acid or a thioglycolic acid derivative.

(Structure 3)

The method according to Structure 1, wherein:

the compound is a compound having a reducing agent function.

(Structure 4)

The method according to Structure 1, wherein:

the cleaning solution has a pH of 6 or more.

(Structure 5)

The method according to Structure 1, wherein:

a metal oxide on the glass substrate is removed by contacting the glass substrate with the cleaning solution.

(Structure 6)

The method according to Structure 1, wherein:

the cleaning process is applied to the glass substrate that was mirror-polished.

(Structure 7)

The method according to Structure 1, wherein:

the cleaning process is applied to the glass substrate that was subjected to a chemical strengthening process.

(Structure 8)

The method according to Structure 1, wherein:

a process of forming a texture is performed by slidably contacting a polishing member with a surface of the glass substrate that was applied with the cleaning process.

(Structure 9)

A method of manufacturing a magnetic disk, comprising:

forming at least a magnetic layer on the glass substrate manufactured by the method according to Structure 1.

(Structure 10)

The method according to Structure 9, wherein:

the magnetic disk is adapted for information recording and reproduction by a magnetic head comprising a magnetoresistive effect reproducing element.

(Structure 11)

The method according to Structure 9, wherein:

the magnetic disk is mounted in a hard disk drive that performs start and stop operation based on a LUL (load/unload) system.

According to this invention, it becomes possible, in a magnetic disk glass substrate, to rapidly and completely dissolve and remove iron oxide-based foreign matter (metal oxide/transition metal oxide-based contamination) adhering to the surface of the magnetic disk glass substrate due to its manufacturing process and, further, metal oxide-based foreign matter itself firmly adhering to the substrate surface, such as abrasive residue (metal oxide/rare earth oxide-based contamination) itself, without corroding a material of the substrate. As a result, it becomes possible to solve the foregoing problem of lowering of the product yield due to the particles, thereby improving the product yield.

DESCRIPTION OF THE PREFERRED EMBODIMENT

Hereinbelow, an embodiment of this invention will be described.

This invention is based on the finding that an aqueous solution containing a chemical substance such as thioglycolic acid or a thioglycolic acid derivative rapidly and completely dissolves a metal oxide, such as iron oxide particles, itself.

This invention is a manufacturing method of a glass substrate for a magnetic disk including a cleaning process of the glass substrate and is characterized in that the cleaning process includes a process of contacting the glass substrate with an aqueous solution (cleaning solution) containing a chemical substance (compound), such as thioglycolic acid or a thioglycolic acid derivative, having a thiol group (—SH) in a molecular structure.

The cleaning solution according to this invention is a cleaning solution that can rapidly, selectively, and completely dissolve and remove iron oxide-based foreign matter (metal oxide/transition metal oxide-based contamination) adhering to the substrate surface and, further, metal oxide-based foreign matter itself firmly adhering to the substrate surface, such as abrasive residue (metal oxide/rare earth oxide-based contamination) itself, without corroding the substrate surface.

In this invention, there can be cited, as thioglycolic acid and thioglycolic acid derivatives, thioglycolic acid ($HSCH_2COOH$),
ammonium thioglycolate (ATG) ($HSCH_2COONH_4$) (alias: ammonium mercaptoacetate),
sodium thioglycolate ($HSCH_2COONa$),
potassium thioglycolate ($HSCH_2COOK$),
monoethanolamine thioglycolate (TG-MEA) ($HSCH_2COONH_3C_2H_4OH$),
methyl thioglycolate ($HSCH_2COOCH_3$),
2-ethylhexyl thioglycolate (OTG) ($HSCH_2COOC_8H_{17}$),
3-methoxybutyl thioglycolate (MTG) ($HSCH_2COOCH_2CH_2CHCH_3$),
ethyleneglycol bis(thioglycolate) (EGTG) ($HSCH_2COOC_2H_4OCOCH_2SH$),
1,4-butanediol bis(thioglycolate) (BDTG) ($HSCH_2COOC_4H_8OCOCH_2SH$),
trimethylolpropane tris(thioglycolate) (TMTG) (($HSCH_2COOCH_2)_3CC_2H_5$),
pentaerythritol tetrakis(thioglycolate) (PETG) (($HSCH_2COOCH_2)_4C$), and so on.

Among them, particularly, ammonium thioglycolate (ATG) is preferable and, secondly, thioglycolic acid,
sodium thioglycolate ($HSCH_2COONa$),
potassium thioglycolate ($HSCH_2COOK$), and so on are preferable.

The amount (concentration) of the chemical substance used in this invention such as thioglycolic acid or its derivative having the thiol group (—SH) in the molecular structure is 1 to 60 wt % and preferably 5 to 20%. When the concentration in the solution becomes 0.5 wt % or less, the dissolution rate becomes extremely slow so that practical use of it as a cleaning solution becomes difficult.

In this invention, use can be made of a cleaning solution obtained by mixing at least one kind or more of an inorganic acid, an organic acid, a complexing agent (chelating agent), a reducing agent, a surfactant, and halide ions into the foregoing cleaning solution of this invention. This is in terms of further enhancing the cleaning effect. However, when adding these mixing components, it has been found that there are those components that impede the dissolvability wherein, for example, the dissolution rate is reduced by the addition thereof. Therefore, it is desirable that such components be not added or be added to a degree that does not impede the dissolvability.

In this invention, after the cleaning with the foregoing cleaning solution of this invention, cleaning can be further carried out by the use of a cleaning solution mixed with at least one kind or more of an inorganic acid, an organic acid, a complexing agent, a reducing agent, a surfactant, and halide ions.

In this invention, the compound forming the foregoing cleaning solution of this invention is preferably a compound having a reducing agent function. This is in terms of further enhancing the cleaning effect.

As inorganic acids for use in this invention, there is no particular limitation, but use may be made of sulfuric acid, nitric acid, hydrochloric acid, aqueous hydrogen peroxide, and so on.

As organic acids for use in this invention, there is no particular limitation. Normally, an organic acid also functions as a complexing agent. Use may be made of organic acids each containing a sulfonic group, a carboxyl group, an amino group, or the like, such as citric acid, oxalic acid, fumaric acid, malic acid, tartaric acid, malonic acid, maleic acid, salicylic acid, ascorbic acid, ethylenediaminetetraacetic acid, aminoethanesulfonic acid, and glyoxylic acid. The addition amount is preferably 1 to 20 wt %.

As surfactants for use in this invention, there is no particular limitation, but use may be made of ion-based surfactants, nonion-based surfactants, and amphoteric surfactants, such as sodium laurate, sodium dodecylbenzenesulfonate, sodium dodecyl sulfate, stearylamine hydrochloride, polyethylene glycol, and stearylamine hydrochloride. The addition amount is preferably 0.001 to 5 wt %.

The aqueous solution containing the chemical substance such as thioglycolic acid or its derivative having the thiol group (—SH) in the molecular structure has merit in that it can be processed at ordinary temperature and neutral. Further, from the aspect of safety, it does not fall under domestic laws and is subjected to no limitation on use, and does not corrode a material such as stainless steel forming a chemical solution layer.

In this invention, upon cleaning with the foregoing cleaning solution according to this invention, it is preferable to clean the substrate while irradiating (applying) an ultrasonic wave having a frequency of 28 kHz or more. This is in terms of further enhancing the cleaning effect.

In this invention, upon cleaning with the foregoing cleaning solution according to this invention, it is preferable to clean the substrate while temperature-controlling the cleaning solution at a temperature of 20° C. to 80° C. This is in terms of further enhancing the cleaning effect.

In this invention, the process of contacting the glass substrate with the cleaning solution can be carried out by a method of immersing the substrate to be cleaned into the cleaning solution, a method of discharging the cleaning solution to the substrate to be cleaned, or the like.

The magnetic disk glass substrate manufacturing method of this invention is characterized by removing a metal oxide on the glass substrate by contacting the glass substrate with the foregoing cleaning solution according to this invention (Structure 6).

Herein, it is considered that when the foregoing metal oxide is a transition metal oxide such as an iron oxide, the foregoing functions are synthetically exhibited, which is thus preferable (Structure 6').

Particularly, even in the case where the foregoing metal oxide is a transition metal oxide obtained through a special process, for example, foreign matter (particles, contamination) firmly adhering to the surface in the magnetic disk glass substrate manufacturing process, such as strong Fe-based contamination adhering in a chemical strengthening process or the like (strong and stable contamination containing an iron oxide as a main component, which cannot be easily removed) (Structure 6'), a metal oxide such as lanthanoid oxide such as lanthanum oxide or neodymium oxide being a component of a cerium abrasive (Structure 6"), or the like, the function of rapidly and completely dissolving and removing the foreign matter (particles, contamination) itself is suitably exhibited in the actual manufacturing process, which is thus preferable.

In the magnetic disk glass substrate manufacturing method of this invention, the cleaning process with the foregoing cleaning solution of this invention is preferably applied to the mirror-polished glass substrate (Structure 6). This is for solving or reducing a problem of abrasive residue peculiar to the mirror-polished magnetic disk glass substrate.

In the magnetic disk glass substrate manufacturing method of this invention, the cleaning process with the foregoing cleaning solution of this invention is preferably applied to the chemically strengthened glass substrate (Structure 7). This is for solving or reducing a problem of foreign matter (particles, contamination) firmly adhering to the surface of the magnetic recording disk glass substrate, such as Fe-based contamination firmly adhering to the substrate surface in the chemical strengthening process.

In the magnetic disk glass substrate manufacturing method of this invention, it is preferable to carry out a process of forming a texture by slidably contacting a polishing member with the surface of the magnetic disk glass substrate that was applied with the cleaning process using the foregoing cleaning solution of this invention (Structure 8). This is for solving or reducing a problem that when texture processing (polishing) is carried out in the state where foreign matter such as metal particles is present on the substrate surface, there is a case where rubbing cracks (cracks like tails of shooting stars: comet defect) occur due to the foreign matter.

In a magnetic disk manufacturing method of this invention, at least a magnetic layer is formed on the glass substrate manufactured by the foregoing magnetic disk glass substrate manufacturing method of this invention (Structure 9).

The magnetic disk manufacturing method of this invention is particularly suitable for a manufacturing method of a magnetic disk that is adapted for information recording and reproduction by a magnetic head comprising a magnetoresistive effect reproducing element (Structure 10). This is because the foregoing foreign matter (particles, contamination) causes occurrence of thermal asperity being a problem of reproduction malfunction by the magnetoresistive effect reproducing element, recording error and erroneous reproduction, and so on.

The magnetic disk manufacturing method of this invention is particularly suitable for a manufacturing method of a magnetic disk adapted to be mounted in a hard disk drive that performs start and stop operation based on a LUL (load/unload) system (Structure 11). In the LUL (load/unload) system, the foregoing foreign matter (particles, contamination) causes occurrence of head crash and so on because a reduction in distance between the head and the medium is impeded.

TEST EXAMPLE 1

(Test for Confirming Complete Dissolvability to Iron Oxide itself)

For confirming dissolvability to an iron oxide, various test solutions shown in Table 1 were adjusted to predetermined concentration conditions and pH conditions and, thereafter, powder of an iron oxide (III) ($Fe_2O_3$) and powder of an iron oxide (II) ($Fe_3O_4$) (both are special grade articles manufactured by Kanto Chemical) were added in an amount of 0.01%, thereby confirming the dissolvability by visual observation.

As an index of the dissolvability, the test solution that achieved complete dissolution within 15 minutes was given ⊚, the test solution that achieved complete dissolution within 30 minutes was given ○, the test solution that achieved complete dissolution within one hour was given Δ, and the test solution with no confirmation of dissolvability at all after 24 hours was given ×. The results are shown in Table 1.

TABLE 1

| Test Solution | Chemical Name and Concentration | pH | Dissolvability |
|---|---|---|---|
| 1 | Ammonium Thioglycolate: 1-70% | 5 or more | ⊚ |
| 2 | Sodium Thioglycolate: 10% | 5 or more | ⊚ |
| 3 | Thioglycolic Acid: 10% | 5 or more | ⊚ |
| 4 | Monoethanolamine Thioglycolate: 10% | 5 or more | ○ |
| 5 | 10% Ammonium Thioglycolate + 5% EDTA | 5 or more | ⊚ |
| 6 | 10% Ammonium Thioglycolate + 5% Citric Acid | 5 or more | ⊚ |

TABLE 1-continued

| Test Solution | Chemical Name and Concentration | pH | Dissolvability |
|---|---|---|---|
| 21 | 6% Nitric Acid + 20% Citric Acid | | X(Inorganic Acid 1 + Chelating Agent 1) |
| 22 | 6% Nitric Acid + 3% EDTA | | X(Inorganic Acid 1 + Chelating Agent 2) |
| 23 | 6% Nitric Acid + 10% Succinic Acid | | X(Inorganic Acid 1 + Chelating Agent 3) |
| 24 | 10% Sulfuric Acid + 20% Citric Acid | | X(Inorganic Acid 2 + Chelating Agent 1) |
| 25 | 10% Sulfuric Acid + 3% EDTA | | X(Inorganic Acid 2 + Chelating Agent 2) |
| 26 | 10% Sulfuric Acid + 10% Succinic Acid | | X(Inorganic Acid 2 + Chelating Agent 3) |
| 27 | 6% Sulfuric Acid + 4% Hydrochloric Acid | | X(Mixed Acid) |
| 28 | 9.3% Hypophosphorous Acid + 3% EDTA | | X(Reducing Agent 1 + Chelating Agent 1) |
| 29 | 9.3% Hypophosphorous Acid + 20% Citric Acid | | X(Reducing Agent 1 + Chelating Agent 2) |
| 30 | 10% Sulfuric Acid + 2% Ascorbic Acid | | X |
| 31 | 0.2% $H_2SiF_6$ (Hydrosilicofluoric Acid) | | X |

As shown in Table 1, it is understood that aqueous solutions (test solutions 1 to 4) containing chemical substances such as thioglycolic acid and thioglycolic acid derivatives, respectively, and aqueous solutions (test solutions 5 and 6) each obtained by adding an additional component to the foregoing test solution have the function of rapidly and completely dissolving the iron oxide particles themselves.

On the other hand, with respect to aqueous solutions (test solutions 21 to 26) each containing an inorganic acid and a chelating agent, a mixed acid (test solution 7'), aqueous solutions (test solutions 28 and 29) each containing a reducing agent and a chelating agent, a cleaning agent (test solution 30) for use in dissolving and removing cerium oxide-based particles being an abrasive component, and a cleaning agent (test solution 31) utilizing substrate etching action, no dissolvability was confirmed at all after the lapse of 24 hours.

The same test was carried out by variously changing the foregoing concentration conditions and the foregoing temperature conditions over wide ranges, respectively, but no change was observed, i.e. the results were the same.

TEST EXAMPLE 2

(Test for Confirming Influence on Glass Substrate Surface)

For examining the influence on the glass substrate surface under the chemical solution conditions, where the dissolvability was confirmed, as compared with cleaning solutions conventionally used in glass substrate cleaning, hard disk glass substrates each having a surface roughness Ra of 0.40 nm were immersed in the following chemical solutions for a predetermined time and, after rinsing and drying, the surface roughness was measured. The results are shown in Table 2.

TABLE 2

| Test Solution | Kind of Chemical Solution | Condition | Ra (nm) |
|---|---|---|---|
| 1 | 16.6% Ammonium Thioglycolate | RT (Room Temperature) 3 min | 0.40 |
| 31 | 0.2% $H_2SiF_6$ | 40° C. 3 min | 0.49 |
| 30 | Sulfuric Acid + Ascorbic Acid | | 0.41 |
| 40 | Sulfuric Acid:Aqueous Hydrogen Peroxide: 4:1 | 80° C. 3 min | 0.40 |
| 50 | Water | | 0.40 |

TEST EXAMPLE 3

There were prepared a plurality of magnetic recording disk glass substrates subjected to failure due to foreign matter (particles, contamination) firmly adhering to the surfaces in the magnetic disk glass substrate manufacturing process, such as strong Fe-based contamination adhering in a chemical strengthening process or the like (Fe-based contamination failure, the number and positions of contaminants having been confirmed).

These magnetic disk glass substrates were cleaned with aqueous solutions according to this invention shown in Table 3 and then applied with a normal cleaning process, thereby obtaining samples of the Example.

Further, samples of Comparative Example were obtained which were not applied with cleaning using any of the aqueous solutions according to this invention, but applied with only a normal cleaning process.

The normal cleaning process was carried out such that the glass disks were immersed in concentrated sulfuric acid heated to about 40° C. so as to be cleaned, then further immersed in respective cleaning baths of pure water (1), pure water (2), IPA (isopropyl alcohol), and IPA (steam drying) in turn so as to be subjected to ultrasonic cleaning and drying.

As a result, as shown in Table 3, the aqueous solutions having a pH of 5 or more among the aqueous solutions according to this invention rapidly and completely dissolved the Fe-based contamination and, consequently, the Fe-based contamination was not detected after the cleaning.

On the other hand, with respect to the aqueous solutions having a pH of less than 5 among the aqueous solutions according to this invention and sample solutions 61 to 64, dissolution of the Fe-based contamination was not observed. However, with respect to sample solutions 61 to 64, there were observed a reduction in the number of Fe-based contaminants and a reduction in the Fe-based contamination size.

Further, with respect to the samples that were not applied with the process using any of the test solutions shown in Table 3 but applied with only the normal cleaning process, there was observed no dissolution of the Fe-based contamination and, further, there were observed no reduction in the number of Fe-based contaminants and no reduction in the Fe-based contamination size.

The same test was conducted by variously changing the foregoing concentration conditions and the foregoing temperature conditions over wide ranges, respectively, but no change was observed, i.e. the results were the same.

As an index of the dissolvability in Table 3, the test solution that achieved complete dissolution within 15 minutes was given ⊚, the test solution that achieved complete dissolution within 30 minutes was given ○, the test solution that achieved complete dissolution within one hour was given Δ, and the test solution with no confirmation of dissolvability at all after 24 hours was given X.

TABLE 3

| Test Solution | Chemical Name and Concentration | pH | Dissolvability |
|---|---|---|---|
| 3' | Thioglycolic Acid + NaOH | 5 or more | ◎ |
| 3' | Thioglycolic Acid + NaOH | less than 5 | X |
| 3' | Thioglycolic Acid + KOH | 5 or more | ◎ |
| 3' | Thioglycolic Acid + KOH | less than 5 | X |
| 3' | Thioglycolic Acid + NH$_4$OH | 5 or more | ◎ |
| 3' | Thioglycolic Acid + NH$_4$OH | less than 5 | X |
| 1' | Ammonium Thioglycolate + Alkali | 5 or more | ◎ |
| 1' | Ammonium Thioglycolate + Acid | less than 5 | X |
| 61 | Cysteine | 1-14 | X |
| 62 | Mercaptosuccinic Acid | 1-14 | X |
| 63 | Mercaptopropionic Acid | 1-14 | X |
| 64 | Aminoethanethiol Hydrochloride | 1-14 | X |

EXAMPLE 1

Example of Magnetic Disk Glass Substrate Manufacturing Method

A magnetic disk glass substrate in this Example described hereinbelow is manufactured by the following processes (1) to (8).

(1) Rough Grinding Process
(2) Shaping Process
(3) Precision Grinding Process
(4) End Face Mirror Polishing Process
(5) First Polishing Process
(6) Second Polishing Process
(7) Chemical Strengthening Process
(8) Texture Processing At first, there was prepared a disk-shaped glass base member made of amorphous aluminosilicate glass. This aluminosilicate glass contains lithium. The composition of this aluminosilicate glass contains 63.6 wt % SiO$_2$, 14.2 wt % Al$_2$O$_3$, 10.4 wt % Na$_2$O, 5.4 wt % Li$_2$O, 6.0 wt % ZnO$_2$, and 0.4 wt % Sb$_2$O$_3$.

(1) Rough Grinding Process

Using, as a glass base member, a sheet glass with a thickness of 0.6 mm formed from molten aluminosilicate glass, a disk-shaped glass disk having a diameter of 28.7 mm and a thickness of 0.6 mm was obtained from the sheet glass by the use of a grindstone.

As a method of forming the sheet glass, a downdraw method or a float method is generally used. However, other than this, the disk-shaped glass base member may be obtained by direct press. The aluminosilicate glass being the material of the sheet glass is required to contain 58 to 75 wt % SiO$_2$, 5 to 23 wt % Al$_2$O$_3$, 4 to 13 wt % Na$_2$O, and 3 to 10 wt % Li$_2$O.

Then, a rough grinding process was applied to the glass disk for improving its size accuracy and shape accuracy. This rough grinding process was carried out by the use of a double-side grinding machine and abrasive grains of grain size #400.

Specifically, at first, using alumina abrasive grains of grain size #400, setting a load to about 100 kg, and rotating a sun gear and an internal gear, both surfaces of the glass disk placed in a carrier were ground to a profile irregularity of 0 to 1 µm and a surface roughness (Rmax) of about 6 µm.

(2) Shaping Process

Then, by the use of a cylindrical grindstone, a circular hole having a diameter of 6.1 mm was formed at a center portion of the glass disk and grinding was applied to an outer peripheral end face to obtain a diameter of 27.43 mm, and then, predetermined chamfering was applied to the outer peripheral end face and an inner peripheral end face. In this event, the surface roughness of the end faces of the glass disk was about 4 µm in Rmax.

Generally, a magnetic disk having an outer diameter of 65 mm is used in a "2.5-inch HDD (hard disk drive)".

(3) Precision Grinding Process

Then, the grain size of the abrasive grains was changed to #1000 and the main surfaces of the glass disk were ground to thereby obtain a surface roughness of about 2 µm in Rmax and about 0.2 µm in Ra.

By carrying out this precision grinding process, it is possible to remove a fine concave-convex shape formed on the main surfaces in the preceding rough grinding process and shaping process.

The glass disk having been subjected to such a precision grinding process was immersed in respective cleaning baths, applied with ultrasonic wave, of neutral detergent and water in turn, thereby carrying out ultrasonic cleaning.

(4) End Face Mirror Polishing Process

Then, the end faces (inner peripheral end face and outer peripheral end face) of the glass disk were polished to about 1 µm in Rmax and about 0.3 µm in Ra by conventionally used brush polishing while rotating the glass disk.

Then, the main surfaces of the glass disk having been subjected to the end face mirror polishing process were rinsed with water.

In this end face mirror polishing process, end faces are polished by placing glass disks in layers. In order to prevent occurrence of cracks or the like on the main surfaces of the glass disks in this event, it is preferable to carry out this end face mirror polishing process before a later-described first polishing process or before or after a later-described second polishing process.

By this end face mirror polishing process, the end faces of the glass disk were finished to a mirror surface state capable of preventing generation of dust such as particles. The diameter of the glass disk was measured after the end face mirror polishing process and it was 27.4 mm.

(5) First Polishing Process

Then, in order to remove cracks and distortion remaining in the foregoing precision grinding process, the first polishing process was carried out by the use of a double-side polishing machine. In the double-side polishing machine, the glass disk held by a carrier is tightly placed between upper and lower surface plates where polishing pads are bonded, then this carrier is meshed with a sun gear and an internal gear and the glass disk is clasped by the upper and lower surface plates. Thereafter, by rotating the sun gear while supplying a polishing solution between the polishing pads and the polishing surfaces (main surfaces) of the glass disk, the glass disk performs an orbital motion around the internal gear while rotating on its axis on the surface plates, so that both main surfaces are simultaneously polished.

As a double-side polishing machine used in the following Example, the same machine is used.

Specifically, hard polishers (hard urethane foam) were used as the polishers to carry out the first polishing process. The polishing conditions were such that use was made of a polishing solution containing cerium oxide (average grain size 1.3 µm) and RO water, a load was set to 100 g/cm$^2$, and a polishing time was set to 15 minutes. Then, the glass disk having been subjected to the first polishing process was immersed in respective cleaning baths of neutral detergent, pure water (1), pure water (2), IPA (isopropyl alcohol), and IPA (steam drying) in turn so as to be subjected to ultrasonic cleaning and drying.

(6) Second Polishing Process

Then, the second polishing process was carried out, as a main surface mirror polishing process, by the use of a double-side polishing machine which was the same as that used in the first polishing process, while the polishers were changed to soft polishers (suede pads).

Then, the glass disk having been subjected to the second polishing process was immersed in respective cleaning baths of neutral detergent, pure water (1), pure water (2), IPA (isopropyl alcohol), and IPA (steam drying) in turn so as to be subjected to ultrasonic cleaning and drying.

(7) Chemical Strengthening Process

Then, a chemical strengthening process was applied to the glass disk having been subjected to the cleaning. The chemical strengthening process was carried out by the use of a chemical strengthening solution in the form of a mixture of potassium nitrate and sodium nitrate.

This chemical strengthening solution was heated to 340° C. to 380° C. and the glass disk having been subjected to the cleaning and drying was immersed in the chemical strengthening solution for about 2 to 4 hours, thereby carrying out the chemical strengthening process. In order to chemically strengthen the entire glass disk surfaces, the immersion was carried out in the state where the glass disks were received in a holder so as to be retained at their end faces.

The glass disk having been subjected to the chemical strengthening process was immersed in a water bath at 20° C. so as to be rapidly cooled, and maintained for about 10 minutes (heat shock process).

Then, before "(8) Texture Processing" being the next process, the glass disk having been subjected to the heat shock process was immersed in an ammonium thioglycolate aqueous solution (concentration: 10 wt %, temperature: 40° C.) being a cleaning solution according to this invention for 4 minutes so as to be cleaned. Then, the glass disk was immersed in an alkaline cleaning agent heated to about 50° C., so as to be cleaned. Further, the magnetic disk glass substrate having been subjected to the alkaline cleaning was immersed in respective cleaning baths of pure water (1), pure water (2), IPA (isopropyl alcohol), and IPA (steam drying) in turn so as to be subjected to ultrasonic cleaning and drying, thereby obtaining a sample of this invention.

For comparison, before "(8) Texture Processing" being the next process, the glass disk having been subjected to the heat shock process was immersed in concentrated sulfuric acid heated to about 50° C., so as to be cleaned.

Further, the magnetic disk glass substrate having been subjected to the sulfuric acid cleaning was immersed in respective cleaning baths of pure water (1), pure water (2), IPA (isopropyl alcohol), and IPA (steam drying) in turn so as to be subjected to ultrasonic cleaning and drying, thereby obtaining a sample of Comparative Example.

The surface roughness of the main surfaces of the glass disk having been subjected to the foregoing processes was measured by an atomic force microscope (AFM) and it was confirmed to be an ultra-smooth surface having Rmax of 5.0 nm and Ra of 0.405 nm. The numerical values of the surface roughness were calculated according to Japanese Industrial Standard (JIS) B0601 with respect to the surface shape measured by the AFM (atomic force microscope).

(8) Texture Processing

Then, texture processing was applied to the glass disks having been subjected to the chemical strengthening process. This texture processing was carried out by the use of a texture processing machine wherein the glass disk and polishing tapes clasping both main surfaces of the glass disk were slidably moved relative to each other in a predetermined state. The relative slidable movement of the glass disk and the respective polishing tapes was basically a movement in a circumferential direction (tangential direction) of the glass disk and further an oscillating movement drawing a sine curve with respect to the circumferential direction.

Further, in this event, a liquid abrasive containing diamond abrasive grains as polishing grains was supplied between the glass disk and the respective polishing tapes.

In this Example 1, the texture processing conditions were such that cloth tapes were used as the polishing tapes, a polycrystal diamond slurry was used as the abrasive (slurry), the rotational speed of the glass disk was set to 597 rpm, the frequency of oscillation of the glass disk was set to 7.8 Hz, the amplitude of oscillation of the glass disk was set to 1 mm, and the pressure load by pressure rollers was set to 3.675 kg (1.5 pounds).

After the texture processing was finished, the glass disks were immersed in an alkaline cleaning agent heated to about 45° C., so as to be cleaned. Further, the magnetic disk glass substrates having been subjected to the sulfuric acid cleaning were immersed in respective cleaning baths of pure water (1), pure water (2), IPA (isopropyl alcohol), and IPA (steam drying) in turn so as to be subjected to ultrasonic cleaning and drying, thereby obtaining magnetic disk glass substrates.

Then, with respect to the main surfaces and the end faces of the glass disks having been subjected to the cleaning, a visual inspection was carried out and, further, a close inspection was carried out by the use of reflection, scattering, and transmission of light.

As a result, on the main surfaces and the end faces of the glass disk applied, before "(8) Texture Processing", with the cleaning using the ammonium thioglycolate aqueous solution being the cleaning solution according to this invention, iron oxide-based foreign matter (particles) adhering to the substrate surface and, further, abrasive residue (particles) were not found and, further, polish cracks (scratch cracks due to particles) caused by those particles in the texture processing were also not found.

On the other hand, on the main surfaces and the end faces of the glass disk of Comparative Example not applied, before "(8) Texture Processing", with the cleaning using the ammonium thioglycolate aqueous solution being the cleaning solution according to this invention, there was a case where iron oxide-based foreign matter (particles) adhering to the substrate surface and, further, abrasive residue (particles) were found and, further, polish cracks (scratch cracks due to particles) caused by those particles in the texture processing were simultaneously found.

EXAMPLE 2

Example of Magnetic Disk Glass Substrate Manufacturing Method

The "(8) Texture Processing" process in Example 1 was not carried out. Before the normal cleaning process, the glass disk having been subjected to the heat shock process in Example 1 was immersed in an ammonium thioglycolate aqueous solution (concentration: 16.6 wt %, temperature: room temperature) being a cleaning solution according to this invention for 15 minutes so as to be cleaned. Then, the glass disk was immersed in concentrated sulfuric acid heated to about 40° C., so as to be cleaned. Further, the magnetic disk glass substrate having been subjected to the sulfuric acid cleaning was immersed in respective cleaning baths of pure water (1), pure water (2), IPA (isopropyl alcohol), and IPA (steam drying) in turn so as to be subjected to ultrasonic cleaning and drying, thereby obtaining a sample of this invention.

For comparison, the normal cleaning process was applied to the glass disk having been subjected to the heat shock process. Specifically, the glass disk was immersed in concentrated sulfuric acid heated to about 40° C., so as to be cleaned. Further, the magnetic disk glass substrate having been subjected to the sulfuric acid cleaning was immersed in respective cleaning baths of pure water (1), pure water (2), IPA (isopropyl alcohol), and IPA (steam drying) in turn so as to be subjected to ultrasonic cleaning and drying, thereby obtaining a sample of Comparative Example.

Then, with respect to the main surfaces and the end faces of the glass disks having been subjected to the cleaning, a visual inspection was carried out and, further, a close inspection was carried out by the use of reflection, scattering, and transmission of light.

As a result, on the main surfaces and the end faces of the glass disk applied with the cleaning using the ammonium thioglycolate aqueous solution being the cleaning solution according to this invention, iron oxide-based foreign matter (particles) adhering to the substrate surface and, further, abrasive residue (particles) were not found.

On the other hand, on the main surfaces and the end faces of the glass disk of Comparative Example not applied with the cleaning using the ammonium thioglycolate aqueous solution being the cleaning solution according to this invention, there was a case where iron oxide-based foreign matter (particles) adhering to the substrate surface and, further, abrasive residue (particles) were found.

According to this invention, it becomes possible, in a magnetic disk glass substrate, to rapidly and completely dissolve and remove iron oxide-based foreign matter (metal oxide/transition metal oxide-based contamination) adhering to the surface of the magnetic disk glass substrate due to its manufacturing process and, further, metal oxide-based foreign matter itself firmly adhering to the substrate surface, such as abrasive residue (metal oxide/rare earth oxide-based contamination) itself, without corroding a material of the substrate. Consequently, it becomes possible to solve the foregoing problem of lowering of the product yield due to the particles, thereby improving the product yield. Therefore, this invention is suitably applicable to a hard disk drive, particularly, a hard disk drive that performs start and stop operation based on a LUL (load/unload) system.

What is claimed is:

1. A method of manufacturing a glass substrate for a magnetic disk including at least a chemical strengthening process of the glass substrate and a cleaning process of the glass substrate, wherein:
the cleaning process includes a process of contacting the glass substrate with a cleaning solution containing a compound having a thiol group as a functional group to chemically remove iron oxide-based foreign matter adhering to a surface of the substrate by a dissolving treatment,
wherein the cleaning process is performed after the chemical strengthening process, and the iron oxide-based foreign matter is adhered to the surface of the substrate in the chemical strengthening process.

2. The method according to claim 1, wherein:
the compound is thioglycolic acid or a thioglycolic acid derivative.

3. The method according to claim 1, wherein:
the compound is a compound having a reducing agent function.

4. The method according to claim 1, wherein:
the cleaning solution has a pH of 6 or more.

5. The method according to claim 1, wherein:
a metal oxide on the glass substrate is removed by contacting the glass substrate with the cleaning solution.

6. The method according to claim 1, wherein:
the cleaning process is applied to the glass substrate that was mirror-polished.

7. The method according to claim 1, wherein:
a process of forming a texture is performed by slidably contacting a polishing member with a surface of the glass substrate that was applied with the cleaning process.

8. A method of manufacturing a magnetic disk, comprising: forming at least a magnetic layer on the glass substrate manufactured by the method according to claim 1.

9. The method according to claim 8, wherein: the magnetic disk is adapted for information recording and reproduction by a magnetic head comprising a magnetoresistive effect reproducing element.

10. The method according to claim 9, wherein:
the amount of the chemical substance having the thiol group (—SH) in the molecular structure is 5 to 20 wt %.

11. The method according to claim 8, wherein: the magnetic disk is mounted in a hard disk drive that performs start and stop operation based on a LUL (load/unload) system.

12. The method according to claim 1, wherein: said dissolving treatment is operative to at least completely dissolve and remove iron oxide-based foreign matter adhering to the substrate surface and, further, metal oxide-based foreign matter itself firmly adhering to the substrate surface, without corroding the substrate surface.

13. The method according to claim 1, wherein:
the amount of the chemical substance having the thiol group (—SH) in the molecular structure is 1 to 60 wt %.

14. The method according to claim 1, wherein:
the process of cleaning includes controlling a temperature of the cleaning solution within a range of 20° C. to 80° C.

15. The method according to claim 1, wherein:
the cleaning solution is applied to a mirror-polished glass substrate.

* * * * *